United States Patent
Ye et al.

(10) Patent No.: US 8,035,253 B2
(45) Date of Patent: Oct. 11, 2011

(54) CONTROLLING METHOD FOR MULTI-CONVERTER STRUCTURE HAVING SERIES-CONNECTED INPUTS AND PARALLEL-CONNECTED OUTPUTS

(75) Inventors: Haoyi Ye, Shanghai (CN); Jianhong Zeng, Shanghai (CN); Hongyang Wu, Shanghai (CN); Chao Yan, Shanghai (CN); Teng Liu, Shanghai (CN); Jianping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 291 days.

(21) Appl. No.: 12/500,868

(22) Filed: Jul. 10, 2009

(65) Prior Publication Data
US 2010/0007221 A1 Jan. 14, 2010

(30) Foreign Application Priority Data
Jul. 10, 2008 (TW) ................. 97126188 A

(51) Int. Cl.
*H02J 1/12* (2006.01)
(52) U.S. Cl. ........................................................ 307/82
(58) Field of Classification Search .......... 307/43, 307/82; 363/15, 34, 65; 323/307
See application file for complete search history.

(56) References Cited

U.S. PATENT DOCUMENTS

| | | | | | |
|---|---|---|---|---|---|
| 5,563,780 | A | * | 10/1996 | Goad | 363/71 |
| 5,768,117 | A | * | 6/1998 | Takahashi et al. | 363/65 |
| 7,012,414 | B1 | * | 3/2006 | Mehrotra et al. | 323/306 |
| 7,157,891 | B1 | * | 1/2007 | Drury et al. | 323/282 |
| 7,298,197 | B2 | * | 11/2007 | Duerbaum et al. | 327/416 |
| 7,558,087 | B2 | * | 7/2009 | Meysenc et al. | 363/35 |
| 7,952,224 | B2 | * | 5/2011 | Sawada et al. | 307/9.1 |

FOREIGN PATENT DOCUMENTS
CN 2070513 U 1/1991
* cited by examiner

*Primary Examiner* — Albert W Paladini
(74) *Attorney, Agent, or Firm* — Volpe and Koenig, P.C.

(57) ABSTRACT

The method of controlling a multi-converter having N converters with series-connected inputs and parallel-connected outputs is provided in the present invention. The proposed controlling method includes steps of: causing each of the N converters to have an intermittent operating period, an intermittent operating time interval and an intermittent operating duty ratio equal to a value of the intermittent operating time interval divided by a value of the intermittent operating period; and causing the N converters to operate alternately with the intermittent operating period, wherein N is an integer larger than one.

20 Claims, 11 Drawing Sheets

CONTROLLING METHOD FOR MULTI-CONVERTER STRUCTURE HAVING SERIES-CONNECTED INPUTS AND PARALLEL-CONNECTED OUTPUTS

FIELD OF THE INVENTION

The present invention relates to controlling methods based on a multi-converter structure having series-connected inputs and parallel-connected outputs. More particularly, the present invention relates to interleaved intermittent controlling methods for the multi-converter structure with converters working under light-load or no-load modes so as to raise the efficiencies of the converters of the structure.

BACKGROUND OF THE INVENTION

The developing trend of the DC/DC converter is just like that of the most of the power supply products, towards the direction of high efficiency. Here, the high efficiency is required to be accomplished not only at the rated load but also at a full range of load, that is to say, from the light-load to the full-load. That means higher requirements have been raised on the efficiency of the DC/DC converter, especially on the light-load efficiency of the DC/DC converter.

By employing a structure having plural converters with parallel-connected inputs and parallel-connected outputs and turning off some converters at the light-load, the whole light-load efficiency of the plural converters could be effectively raised and this method is called "phase shedding" controlling method.

FIG. 1 shows a structure having plural DC/DC converters with series-connected inputs and parallel-connected outputs, in which any of the plural DC/DC converters could be a PWM converter or a resonant converter. As shown in FIG. 1, input terminals of converter 1, converter 2 . . . and converter n are series-connected sequentially to receive the input voltage Vin, and the input terminals of the respective converters are parallel-connected to the respective input capacitors C1, C2 . . . and Cn. Output terminals of converter 1, converter 2 . . . and converter n are parallel-connected to the output capacitor Co to provide the output voltage Vo. This structure is suitable for applying to the occasions having high-voltage input and larger-current output. At the mean time, this structure has the feature of automatically balancing the load of each the converter that is each the converter has the same DC component of the input current. But due to the connecting way of series-connected inputs, the phase shedding control could not be applied on the series-connected inputs and parallel-connected outputs converters. This problem is further elaborated as follows using two converters having series-connected inputs and parallel-connected outputs as shown in FIG. 2 for an example.

As shown in FIG. 2, input terminals of converter 1 and converter 2 are series-connected sequentially to receive the input voltage Vin, and the input terminals of converter 1 and converter 2 are respectively parallel-connected to the corresponding input capacitors C1 and C2. Output terminals of converter 1 and converter 2 are parallel-connected to the output capacitor Co to provide the output voltage Vo. Iin1 and Iin2 are the DC components of the input currents of converter 1 and converter 2 respectively. Vin1 and Vin2 are voltages across input capacitors C1 and C2 respectively and the DC components of Vin1 and Vin2 are expressed as Vin1_d and Vin2_d respectively. Io1 and Io2 are output currents of converter 1 and converter 2 respectively. Under this kind of circuit structure, each converter has its normal operating range according to the design requirements. And each converter has its input voltage range in which it can operate normally. The input voltage range comprises a maximum value Vmax and a minimum value Vmin. The voltage input range is obtained according to the input and output design requirements of each converter and the stress requirements of the elements of each converter.

Under the circumstances that both of the two converters operate normally and stably, Iin1 is equal to Iin2; the DC components of currents flowing through capacitors C1 and C2 are both zero; and the DC voltages Vin1_d and Vin2_d are kept unchanged. If under a certain load condition, e.g., under the light-load condition, converter 1 is turned off, then Iin1 is equal to 0 and direct currents flow through capacitors C1 and C2 to charge capacitor C1 and discharge capacitor C2. Thus, Vin1 is raised and Vin2 is reduced. When Vin2 is lower than the minimum voltage value Vmin of the converter 2, neither converter 1 nor converter 2 could operate normally.

Then a novel controlling method for the structure of multi-converter having series-connected inputs and parallel-connected outputs is provided to avoid the happenings of the aforementioned problems and to effectively raise the efficiency under a certain load condition, e.g., the light-load condition.

Keeping the drawbacks of the prior arts in mind, and employing experiments and research full-heartily and persistently, the applicant finally conceived a controlling method for a multi-converter structure having series-connected inputs and parallel-connected outputs.

SUMMARY OF THE INVENTION

It is therefore an object of the present invention to provide interleaved intermittent controlling methods based on a multi-converter structure having series-connected inputs and parallel-connected outputs so as to improve the efficiencies of the plural converters of the structure while working under light-load or no-load modes.

According to the first aspect of the present invention, a method of controlling a multi-converter having N converters with series-connected inputs and parallel-connected outputs includes steps of: causing each of the N converters to have an intermittent operating period, an intermittent operating time interval and an intermittent operating duty ratio equal to a value of the intermittent operating time interval divided by the intermittent operating period; and causing the N converters to operate alternately according to the intermittent operating period, wherein N is an integer larger than one.

Preferably, N is two.

Preferably, at least two converters of the N converters transmit the same power.

Preferably, the method further includes a step of causing the respective intermittent operating periods of the at least two converters to be substantially the same to each other.

Preferably, the respective intermittent operating time intervals of the at least two converters are complementary to each other.

Preferably, the respective intermittent operating time intervals of the at least two converters are partially overlapped.

Preferably, there is a dead-time interval between the respective intermittent operating time intervals of the at least two converters.

Preferably, the method further includes a step of causing the respective intermittent operating periods of the at least two converters to be different from each other.

Preferably, at least two converters of the N converters transmit different powers.

Preferably, the method further includes a step of causing the respective intermittent operating periods of the at least two converters to be substantially the same to each other.

Preferably, the respective intermittent operating time intervals of the at least two converters are complementary to each other.

Preferably, there is a dead-time interval between the respective intermittent operating time interval of the at least two converters.

According to the second aspect of the present invention, a method of controlling a multi-converter having N converters with series-connected inputs and parallel-connected outputs includes steps of: causing at least one of the N converters to have a relatively longer intermittent operating period and a relatively shorter intermittent operating period; and causing the at least one converter to have an operating time interval of the relatively longer intermittent operating period and to operate intermittently with the relatively shorter intermittent operating period in the operating time interval, wherein N is an integer larger than one.

Preferably, the method further includes a step of causing the N converters to have respective relatively longer intermittent operating periods and respective relatively shorter intermittent operating periods, to have respective operating time intervals of the respective relatively longer intermittent operating periods and to operate intermittently with the respective relatively shorter intermittent operating periods in the respective operating time intervals.

Preferably, the method further includes a step of causing the respective operating time intervals not to be overlapped with each other.

Preferably, the method further includes a step of causing the respective operating time intervals to be partially overlapped with each other.

Preferably, the method further includes a step of causing the respective operating time intervals not to be overlapped with each other and to have a dead-time interval between them.

According to the third aspect of the present invention, a method of controlling a multi-converter having N converters with series-connected inputs and parallel-connected outputs includes steps of: causing each of the N converters to have an intermittent operating duty ratio k/N, wherein $0 \leq k \leq N$ and N is an integer larger than one; and causing k converters of the N converters to operate simultaneously at one certain moment.

Preferably, k is a positive integer.

Preferably, each the converter has an intermittent operating period T and an operating time interval (k/N)*T within the intermittent operating period.

The present invention may best be understood through the following descriptions with reference to the accompanying drawings, in which:

DETAILED DESCRIPTION OF THE PREFERRED EMBODIMENT

Figure 2:
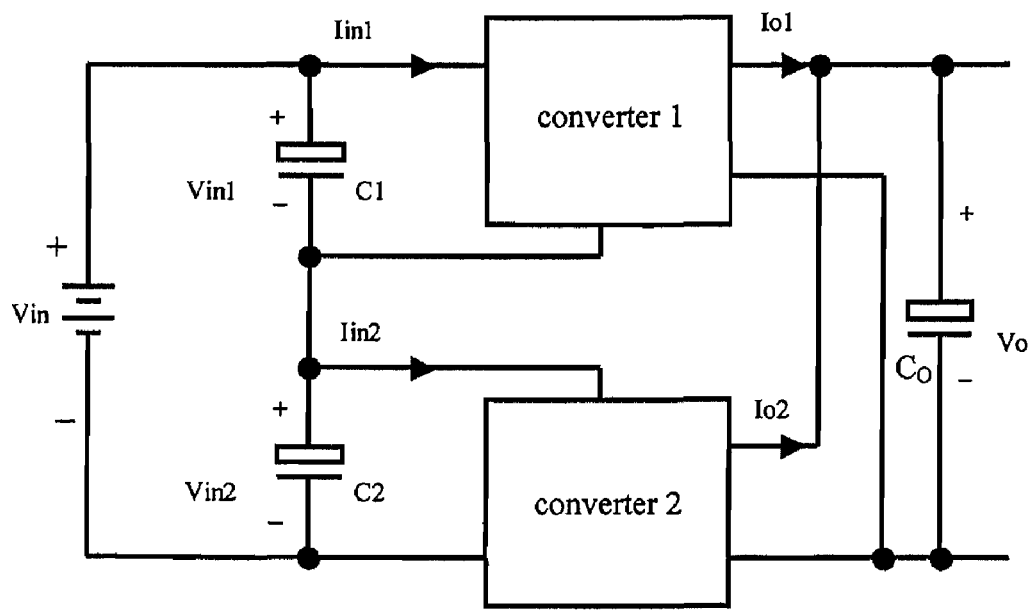
FIG. 2 shows a schematic circuit diagram of a structure having two DC/DC converters with series-connected inputs and parallel-connected outputs in the prior art.

In the structure as shown in FIG. 2, the average power transmitted by the two converters could have different combinations, e.g., the powers transmitted by converter 1 and converter 2 could be either the same, or could be different. Assuming that the average power transmitted by converter 1 and converter 2 are P1 and P2 respectively, then P1=Vin1_d*Iin1, and P2=Vin2_d*Iin2. If Iin1=Iin2, then Vin1_d/Vin2_d=P1/P2, which means the DC component of the input voltage of each converter is directly proportional to its average transmitted power.

Figure 3A:
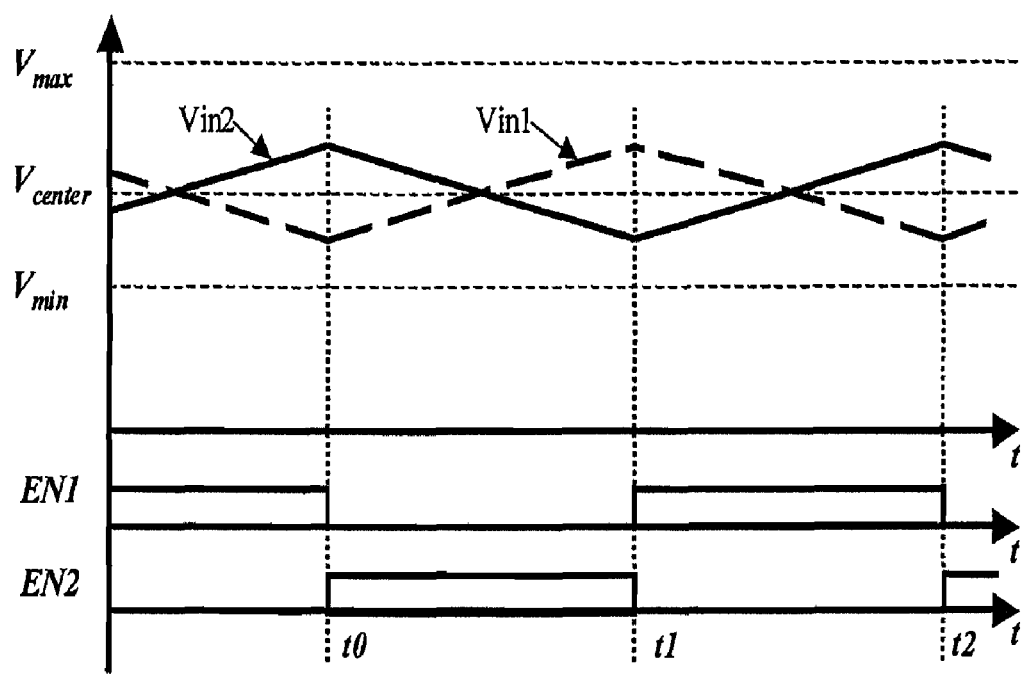
FIGS. 3(a)-3(c) respectively show a waveform diagram of the relative voltages and enable signals when the two converters as shown in FIG. 2 have the same transmitted power and the same intermittent operating period using the respective controlling methods according to the first to the third preferred embodiments of the present invention.
Figure 3B:
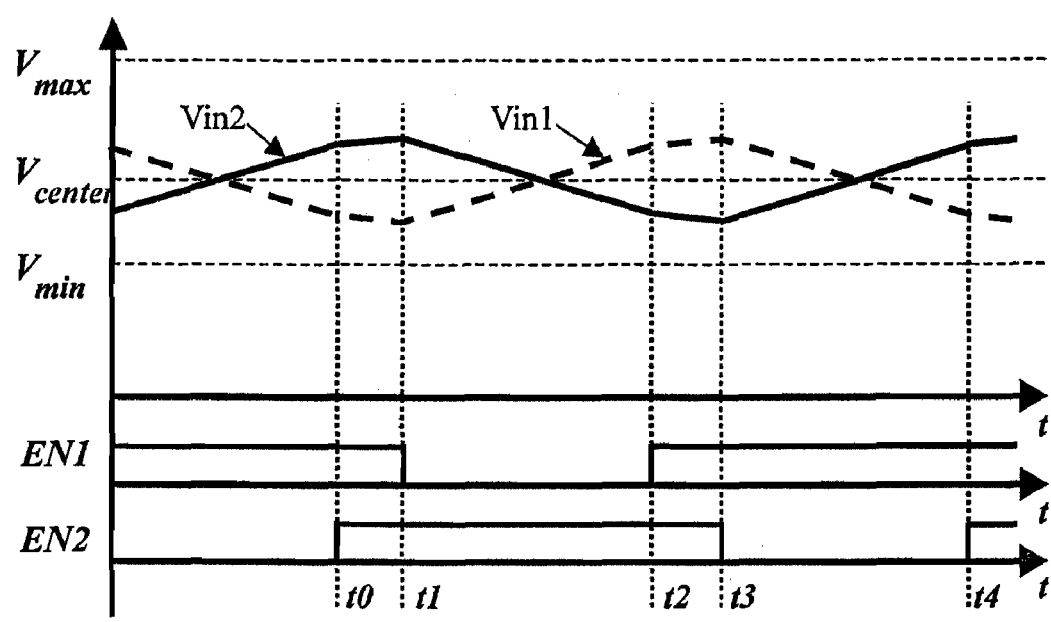
Figure 3C:
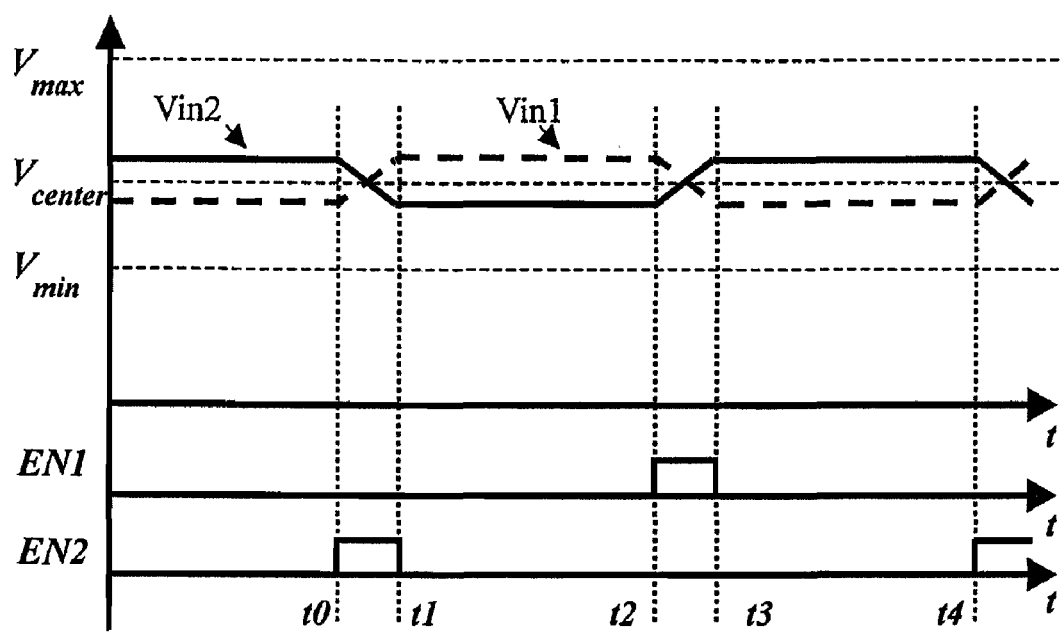

Controlling methods as shown in FIGS. 3(a) to 3(c) are base on the condition that the average transmitted power of the two converters in the structure as shown in FIG. 2 are the same, that is P1=P2, and then Vin1_d=Vin2_d. For each controlling method as shown in FIGS. 3(a) to 3(c), set Vin1_d=Vin2_d as Vcenter firstly, and Vcenter=Vin/2. In FIGS. 3(a) to 3(c), Vmax is the highest input voltage that each converter could bear and Vmin is the lowest voltage required by each converter for normally operation. EN1 and EN2 are the enable signals of converter 1 and converter 2 respectively. When EN1 or EN2 is at a high level, the corresponding converter 1 or converter 2 operates since it is enabled by a high level signal.

The controlling method as shown in FIG. 3(a) is the first preferred embodiment of the present invention, wherein two converters operate alternately, and the operating time intervals are not overlapped but complementary to each other, that is to say only one converter operates at any moment. In the time interval t0~t1, enable signal EN2 is at a high-level, then converter 2 operates and converter 1 does not operate. Thus Vin2 reduces and Vin1 rises. During the time interval t1~t2, enable signal EN1 is at a high-level, then converter 1 operates and converter 2 does not operate. Thus Vin1 reduces and Vin2 rises. Vin1 and Vin2 are both fluctuated around Vcenter, but do not go beyond the range limited by Vmax and Vmin. In FIG. 3(a), the time interval t0~t2 is an intermittent operating period and t0~t1 or t1~t2 is an intermittent operating time interval of the intermittent operating period. As shown in FIG. 3(a), converter 1 and converter 2 have the same intermittent operating frequency which is the reciprocal of the intermittent operating period, and the respective intermittent operating time intervals of converter 1 and converter 2 are also the same, which is 50% of the intermittent operating period that is to say the respective intermittent operating duty ratio (intermittent operating time interval/intermittent operating period) is 50%. Using this method, there is only one converter operating at any moment which raises the efficiency of the converter at the light-load and guarantees the input voltage of each converter falls in the range limited by Vmax and Vmin for normal operation and safety.

The controlling method as shown in FIG. 3(b) is the second preferred embodiment of the present invention, wherein two converters operate alternately, and there is an overlapped time interval, during which both of the two converters operate. In the time intervals t0~t1 and t2~t3, converter 1 and converter 2 both operate. In the time interval t1~t2, only converter 2 operates, thus its input voltage—Vin2 decreases and the input voltage of converter 1—Vin1 rises. In the time interval t3~t4, only converter 1 operates, thus its input voltage—Vin1 decreases and the input voltage of converter 2—Vin2 rises. As shown in FIG. 3(b), converter 1 and converter 2 have the same intermittent operating frequency, which is the reciprocal of the intermittent operating period, e.g., the time interval t0~t4. And the intermittent operating time intervals in one intermittent operating period of converter 1 and converter 2 are both equal to a time interval, e.g., t0~t3, which is larger than 50% of the whole intermittent operating period that is to say the respective intermittent operating duty ratio is larger than 50%.

The controlling method as shown in FIG. 3(c) is the third preferred embodiment of the present invention, wherein two converters operate alternately, and there is a dead time interval during which neither of the two converters operates that is to say the intermittent operating time intervals of the two converters are not overlapped with each other. In the time interval t0~t1, only converter 2 operates, the input voltage of which—Vin2 decreases, and the input voltage of converter 1—Vin1 rises. In the time interval t2~t3, only converter 1 operates, the input voltage of which—Vin1 decreases, and the input voltage of converter 2—Vin2 rises. In the time intervals t1~t2 and t3~t4, neither of converter 1 and converter 2 operates, and Vin1 and Vin2 are kept substantially unchanged. Similarly, Vin1 and Vin2 both fluctuate around Vcenter and are in the range limited by Vmax and Vmin. As shown in FIG. 3(c), converter 1 and converter 2 have substantially the same intermittent operating frequency, which is the reciprocal of the intermittent operating period, e.g., the time interval t0~t4, and the intermittent operating time intervals in one intermittent operating period of the two converters are also the same, which is less than 50% of the intermittent operating period that is to say the respective intermittent operating duty ratio is smaller than 50%.

Figure 4:
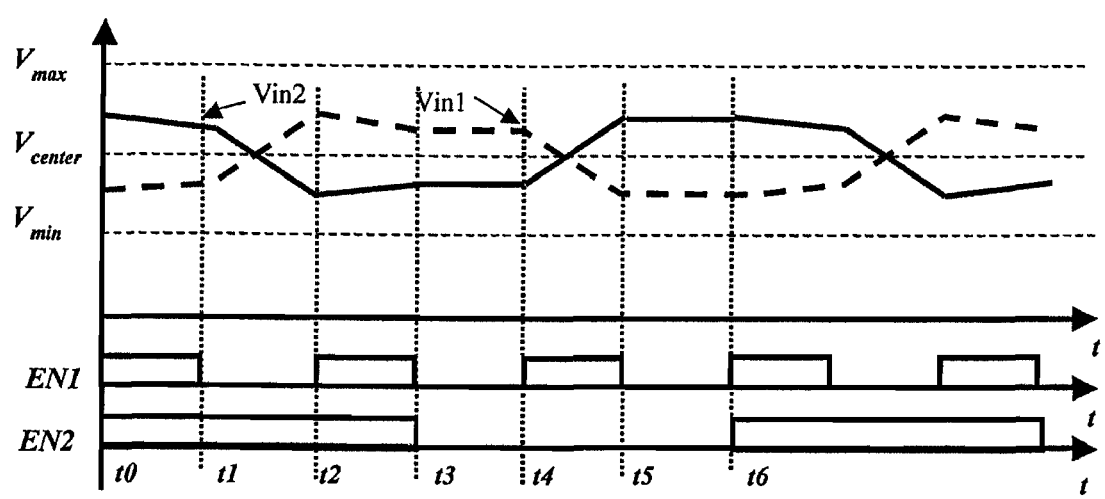
FIG. 4 shows a waveform diagram of the relative voltages and enable signals when the two converters as shown in FIG. 2 have the same transmitted power and different intermittent operating periods using the controlling method according to the fourth preferred embodiment of the present invention.

Different from the controlling methods shown in FIGS. 3(a) to 3(c), which have the same intermittent operating frequency, FIG. 4 presents another control method as the fourth preferred embodiment. In FIG. 4, converter 1 and converter 2 have different intermittent operating frequencies. As shown in FIG. 4, the time interval t0~t2 is an intermittent operating period of converter 1, and the time interval t0~t6 is an intermittent operating period of converter 2, thus the intermittent operating frequency of converter 1 is three times of that of converter 2. Converter 1 and converter 2 both operate in the time intervals t0~t1 and t2~t3. In the time interval t1~t2, only converter 2 operates. In the time intervals t3~t4 and t5~t6, none of converter 1 and converter 2 operates. In the time interval t4~t5, only converter 1 operates.

Figure 5A:
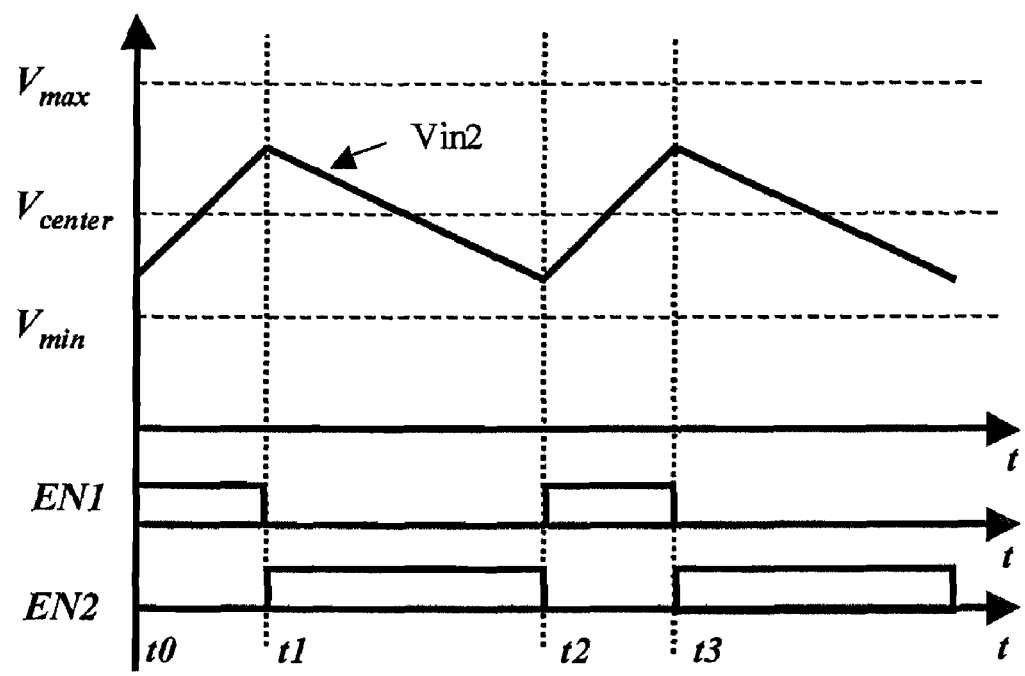
FIGS. 5(a) and 5(b) respectively show a waveform diagram of the relative voltages and enable signals when the two converters as shown in FIG. 2 have different transmitted powers and the same intermittent operating period using the respective controlling methods according to the fifth and the sixth preferred embodiments of the present invention.
Figure 5B:
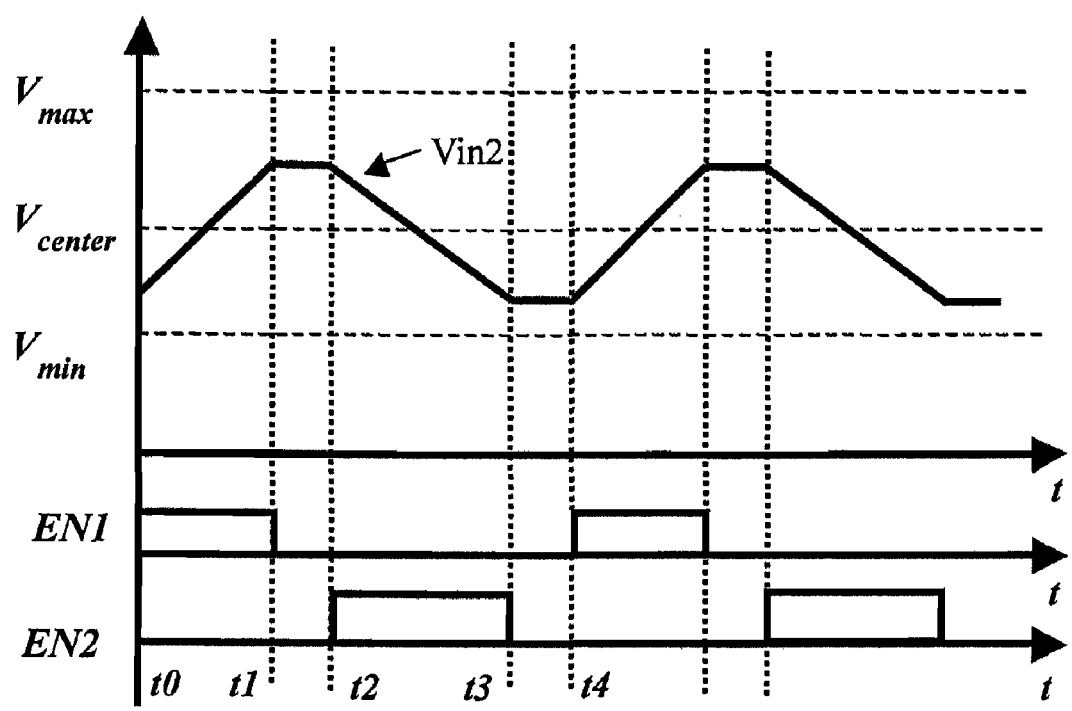

In the above-mentioned preferred embodiments, converter 1 and converter 2 transmit substantially the same power to the loads. FIGS. 5(a) and 5(b) respectively show the control methods under which converter 1 and converter 2 transmit different power to the loads according to the preferred embodiments of the present invention. The reference symbols in FIGS. 5(a) and 5(b) have the same meanings as those of the aforementioned preferred embodiments. In the preferred embodiments as shown in FIGS. 5(a) and 5(b), converter 1 and converter 2 have substantially the same intermittent operating frequency; but the intermittent operating duty ratios of converter 1 and converter 2 are different, which are proportional to the corresponding average transmitted power of converter 1 and converter 2.

FIG. 5(a) shows the fifth preferred embodiment of the present invention. Two converters operate alternately, and the operating time intervals are not overlapped but complementary to each other. The intermittent operating periods of converter 1 and converter 2 are substantially the same, e.g., the time interval t0~t2. In the time interval t0~t1, only converter 1 operates and the input voltage of converter 2 Vin2 rises. In the time intervals t1~t2 only converter 2 operates, and the input voltage of converter 2 Vin2 decreases.

FIG. 5(b) shows the sixth preferred embodiment of the present invention. The intermittent operating periods of converter 1 and converter 2 are substantially the same, e.g., the time interval t0~t4. In the time interval t0~t1, only converter 1 operates and the input voltage of converter 2 Vin2 rises. In the time intervals t2~t3 only converter 2 operates and the input voltage of converter 2 Vin2 decreases. In the dead time intervals t1~t2 and t3~t4, none of converter 1 and converter 2 operates and the input voltage of converter 2 Vin2 kept substantially unchanged.

Among the control methods shown in FIGS. 3(a) to 3(c), each converter operates continuously in its respective intermittent operating time interval of the corresponding intermittent operating period. If each converter operates intermittently in the respective intermittent operating time interval of the corresponding intermittent operating period, then it results in the controlling methods as shown in FIGS. 6(a)-6(c) wherein each of the two converters has two intermittent operating periods.

Figure 6A:
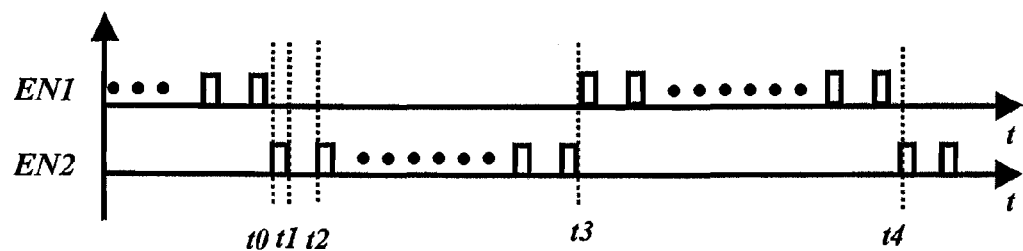
FIGS. 6(a)-6(c) respectively show a waveform diagram of the enable signals when the two converters as shown in FIG. 2 both include two intermittent operating periods using the respective controlling methods according to the seventh to the ninth preferred embodiments of the present invention.

In the seventh preferred embodiment of the present invention as shown in FIG. 6(a), the time interval t0~t2 is a shorter intermittent operating period T1; t0~t1 is an intermittent operating time interval in the intermittent operating period T1. In the time interval t0~t3, converter 2 operates intermittently with the intermittent operating period T1—e.g., converter 2 operates during t0~t1 and does not operate during t1~t2. In the time interval t3~t4, converter 2 stops to operate, thus time interval t0~t4 could be viewed as a longer intermittent operating period T2. And the time interval t0~t3 is the intermittent operating time interval in the intermittent operating period T2. Similarly, converter 1 also has a shorter and a longer intermittent operating period. As shown in FIG. 6(a), the intermittent operating time intervals of the longer intermittent operating period are not overlapped with each other but complementary to each other.

Figure 6B:
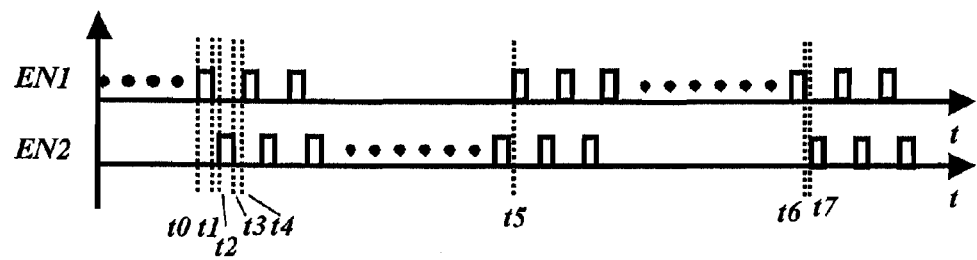

FIG. 6(b) shows the eighth preferred embodiment of the present invention, which is different from that of FIG. 6(a) because the intermittent operating time intervals of the two converters in the longer intermittent operating periods are partially overlapped.

Figure 6C:
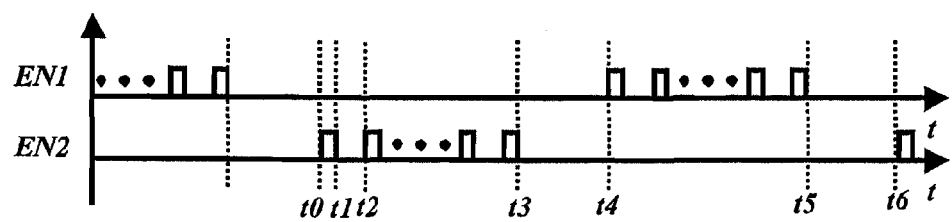

FIG. 6(c) shows the ninth preferred embodiment of the present invention, it is different from that of FIG. 6(a) in that the intermittent operating time intervals of the two converters in the longer intermittent operating period are not overlapped with each other and there is a dead-time interval, e.g., t3~t4 and t5~t6.

Similarly, among the control methods shown in FIGS. 4, 5(a) and 5(b), any converter could operate intermittently in its intermittent operating time interval of its intermittent operating period such that this converter includes two intermittent operating periods.

Figure 1:
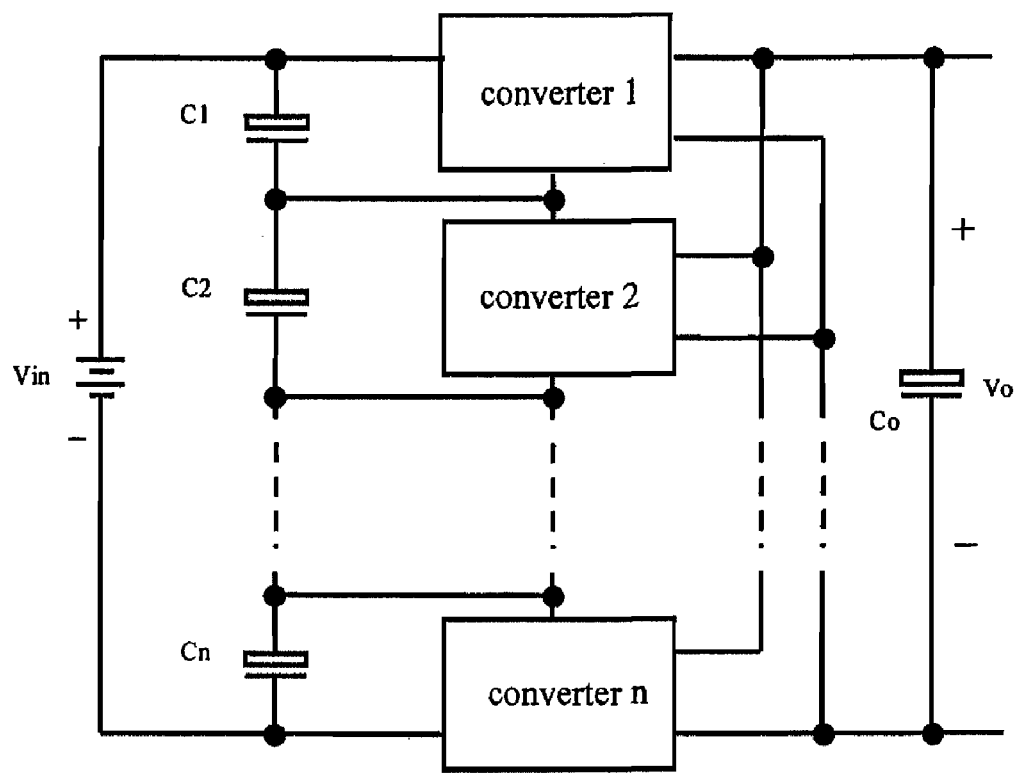
FIG. 1 shows a schematic circuit diagram of a structure having plural DC/DC converters with series-connected inputs and parallel-connected outputs in the prior art.

The above-mentioned method could be used in the structure having plural converters with series-connected inputs and parallel-connected outputs as shown in FIG. 1.

Figure 7A:
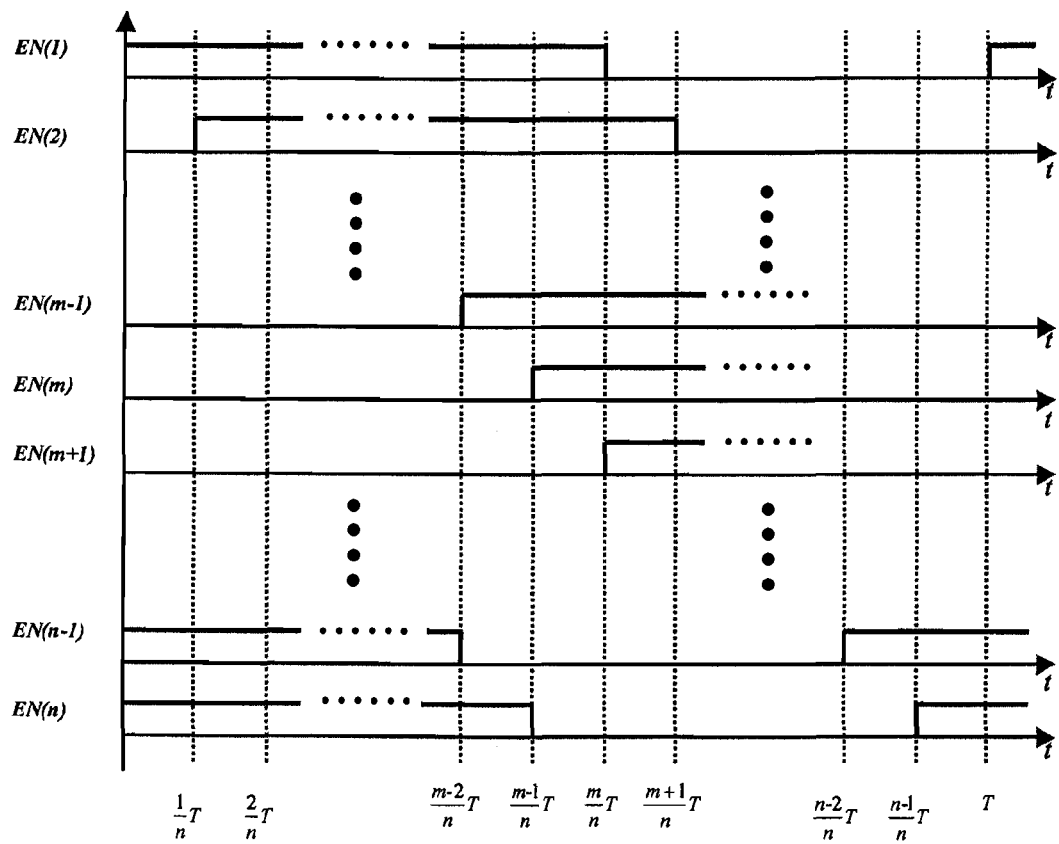
FIGS. 7(a) and 7(b) respectively show a waveform diagram of the enable signals when the plural converters as shown in FIG. 1 switching alternately using the respective controlling methods according to the tenth to the eleventh preferred embodiments of the present invention.

The method as shown in FIG. 7(a) is the tenth preferred embodiment of the present invention. Setting the amount of converters as N, in FIG. 7(a), the intermittent operating period of each converter is T; the intermittent operating time interval in an intermittent operating period is $$\frac{m}{n}T,$$

that is to say the intermittent operating duty ratio is m/n, e.g., converter 1 operates in $$0 \sim \frac{m}{n}T,$$

converter 2 operates in $$\frac{1}{n}T \sim \frac{m+1}{n}T,$$

... and converter n operates in $$0 \sim \frac{m-1}{n}T$$

and $$\frac{n-1}{n}T \sim T,$$

wherein m is a positive integer, and 1≦m≦n. At one certain moment, m converters operate simultaneously. This method is the control method as shown in FIG. 3(a) when n=2 and m=1.

In the method as shown in FIG. 7(a), m is an integer, and exact m converters operate at one certain moment.

Figure 7B:
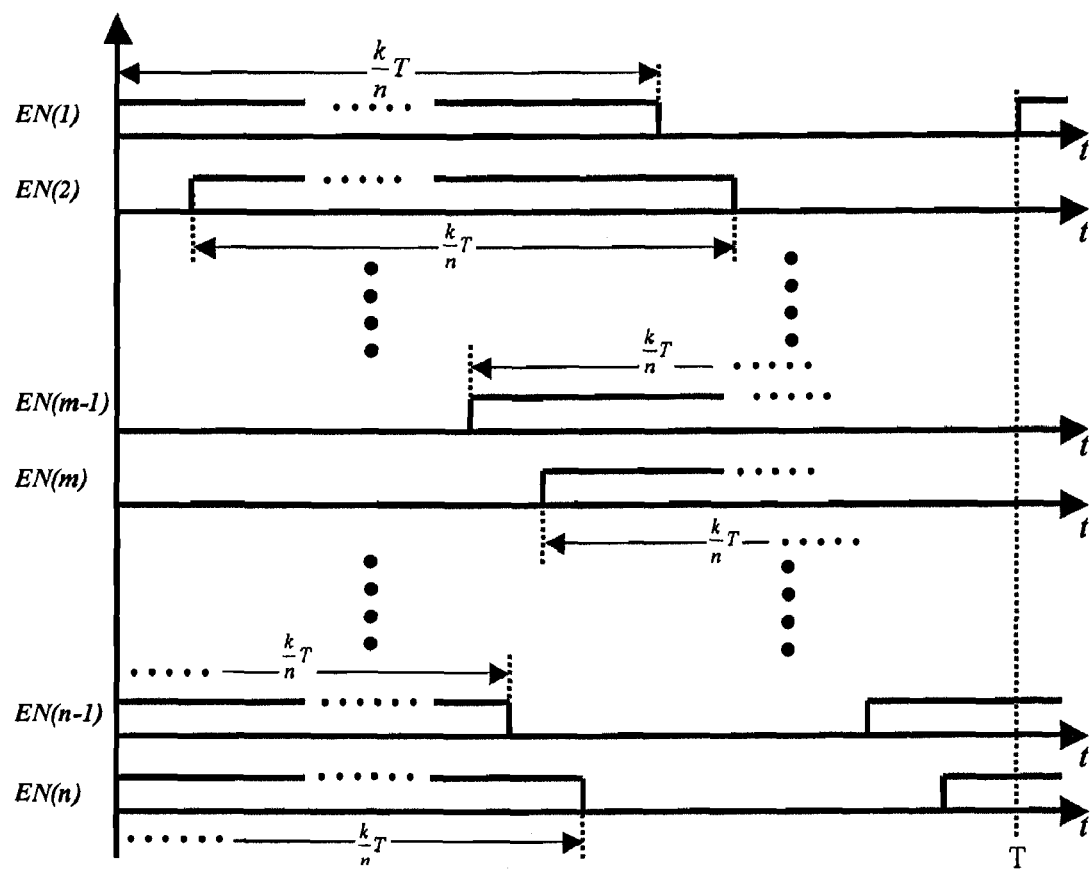

The method as shown in FIG. 7(b) is the eleventh preferred embodiment of the present invention. In FIG. 7(b), k is any positive real value between 0~n and n is an integer; each converter operates with the period T sequentially; and each intermittent operating time interval is $$\frac{k}{n}T$$

that is to say the intermittent operating duty ratio is k/n so as to guarantee the number of converters operating simultaneously is k in average in the period T. The control method is shown in FIG. 3(b) when n=2 and 1<k<2. And the control method is shown in FIG. 3(c) when n=2 and 0<k<1.

According to the aforementioned descriptions, the present invention provides the interleaved intermittent control methods based on a multi-converter structure having series-connected inputs and parallel-connected outputs so as to improve the efficiencies of the plural converters of the structure while, working under light-load or no-load modes.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A method of controlling a multi-converter having N converters with series-connected inputs and parallel-connected outputs, comprising steps of:
    causing each of the N converters to have an intermittent operating period, an intermittent operating time interval and an intermittent operating duty ratio equal to a value of the intermittent operating time interval divided by the intermittent operating period; and
    causing the N converters to operate alternately according to the intermittent operating period, wherein N is an integer larger than one.

2. A method according to claim 1, wherein N is two.

3. A method according to claim 1, wherein at least two converters of the N converters transmit the same power.

4. A method according to claim 3 further comprising a step of causing the respective intermittent operating periods of the at least two converters to be substantially the same to each other.

5. A method according to claim 4, wherein the respective intermittent operating time intervals of the at least two converters are complementary to each other.

6. A method according to claim 4, wherein the respective intermittent operating time intervals of the at least two converters are partially overlapped.

7. A method according to claim 4, wherein there is a dead-time interval between the respective intermittent operating time intervals of the at least two converters.

8. A method according to claim 3 further comprising a step of causing the respective intermittent operating periods of the at least two converters to be different from each other.

9. A method according to claim 1, wherein at least two converters of the N converters transmit different powers.

10. A method according to claim 9 further comprising a step of causing the respective intermittent operating periods of the at least two converters to be substantially the same to each other.

11. A method according to claim 10, wherein the respective intermittent operating time intervals of the at least two converters are complementary to each other.

12. A method according to claim 10, wherein there is a dead-time interval between the respective intermittent operating time intervals of the at least two converters.

13. A method of controlling a multi-converter having N converters with series-connected inputs and parallel-connected outputs, comprising steps of:
   causing at least one of the N converters to have a relatively longer intermittent operating period and a relatively shorter intermittent operating period; and
   causing the at least one converter to have an operating time interval of the relatively longer intermittent operating period and to operate intermittently with the relatively shorter intermittent operating period in the operating time interval, wherein N is an integer larger than one.

14. A method according to claim 13 further comprising a step of causing the N converters to have respective relatively longer intermittent operating periods and respective relatively shorter intermittent operating periods, to have respective operating time intervals of the respective relatively longer intermittent operating periods and to operate intermittently with the respective relatively shorter intermittent operating periods in the respective operating time intervals.

15. A method according to claim 14 further comprising a step of causing the respective operating time intervals not to be overlapped with each other.

16. A method according to claim 14 further comprising a step of causing the respective operating time intervals to be partially overlapped with each other.

17. A method according to claim 14 further comprising a step of causing the respective operating time intervals not to be overlapped with each other and to have a dead-time interval between them.

18. A method of controlling a multi-converter having N converters with series-connected inputs and parallel-connected outputs, comprising steps of:
   causing each of the N converters to have an intermittent operating duty ratio k/N, wherein $0 \leq k \leq N$ and N is an integer larger than one; and
   causing k converters of the N converters to operate simultaneously at one certain moment.

19. A method according to claim 18, wherein k is a positive integer.

20. A method according to claim 18, wherein each the converter has an intermittent operating period T and an operating time interval (k/N)*T within the intermittent operating period.

* * * * *